United States Patent [19]

Edelstein et al.

[11] Patent Number: 5,574,961
[45] Date of Patent: Nov. 12, 1996

[54] PHASE-SEPARATED MATERIAL (U)

[75] Inventors: Alan S. Edelstein, Alexandria, Va.;
Stuart A. Wolf, Greenbelt, Md.;
Kenneth E. Kihlstrom, Santa Barbara, Calif.

[73] Assignee: The United States of America as represented by the Secretary of the Navy, Washington, D.C.

[21] Appl. No.: 711,019

[22] Filed: Jan. 16, 1985

[51] Int. Cl.⁶ .................................................. B22F 7/04
[52] U.S. Cl. .......................... 428/548; 428/558; 428/552; 342/1; 342/2; 250/250; 252/62.55
[58] Field of Search ....................... 252/62.51 R, 62.55, 252/62.58; 75/244, 246; 420/121, 435, 440; 428/900, 548, 552, 558; 250/250, 505.1; 89/36.11; 342/1, 2; 501/96

[56] References Cited

U.S. PATENT DOCUMENTS

| | | | |
|---|---|---|---|
| 3,963,812 | 6/1976 | Schlienger | 264/8 |
| 4,003,840 | 1/1977 | Ishino et al. | 252/62.51 |
| 4,348,229 | 9/1982 | Suemura et al. | 420/121 |
| 4,381,943 | 5/1983 | Dickson et al. | 420/121 |
| 4,405,677 | 9/1983 | Chen | 428/172 |
| 4,407,894 | 10/1983 | Kadokura et al. | 428/457 |

FOREIGN PATENT DOCUMENTS

| | | | |
|---|---|---|---|
| 55-122854 | 9/1980 | Japan | 420/121 |
| 57-82459 | 5/1982 | Japan | 420/121 |
| 5831065 | 2/1983 | Japan | 420/121 |

OTHER PUBLICATIONS

Dormann et al. "Interface Properties in Granular Compound Films Studied By Mossbauer Spectroscopy"Thin Solid Films, 58(1979) pp. 265–272.

Dormann et al. "Magnetic Properties of Granular Fe–$SiO_2$", Physica 86–88B (1977), pp. 1431–1433.

General Electric Contract Report No. AFAL-TR-79-1041, generated by J. M. McGrath, H. Kirtchik and I. S. Jacobs.

*Primary Examiner*—Charles T. Jordan
*Assistant Examiner*—Daniel Jenkins
*Attorney, Agent, or Firm*—Thomas E. McDonnell; John J. Karasek

[57] ABSTRACT

A material for disposition on a surface comprising Fe, Co, or FeCo in the form of small single magnetic domain metallic clusters disposed in an insulating matrix of BN. The material may be utilized as a new absorbing material for radar microwave signals. Additionally, the material may be utilized on a magnetic storage substrate to form a new magnetic recording medium.

11 Claims, 4 Drawing Sheets

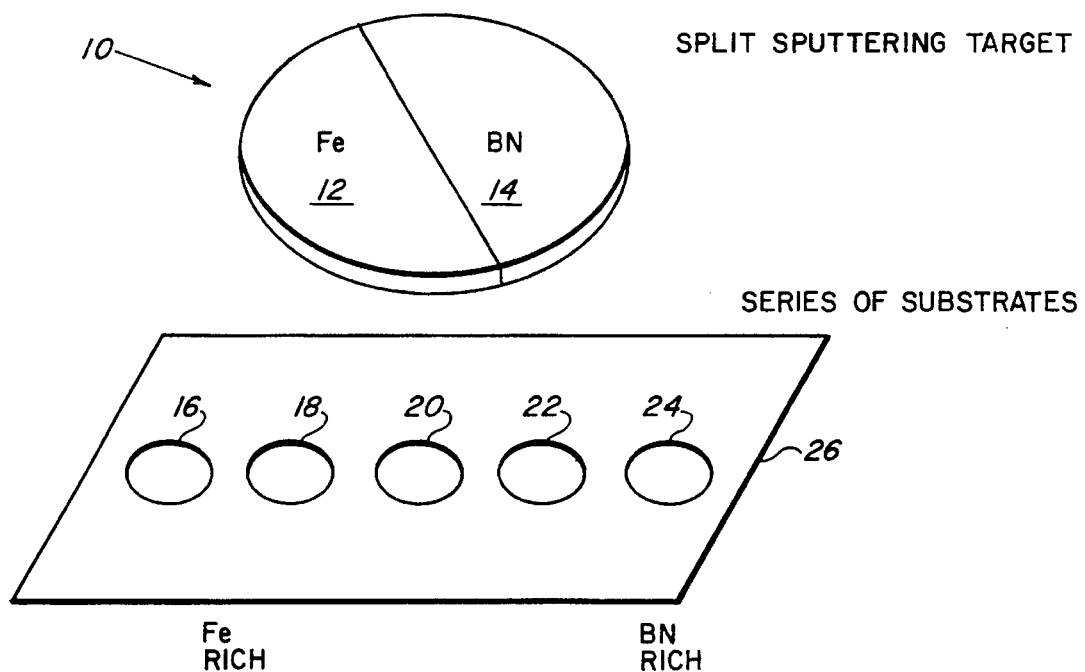
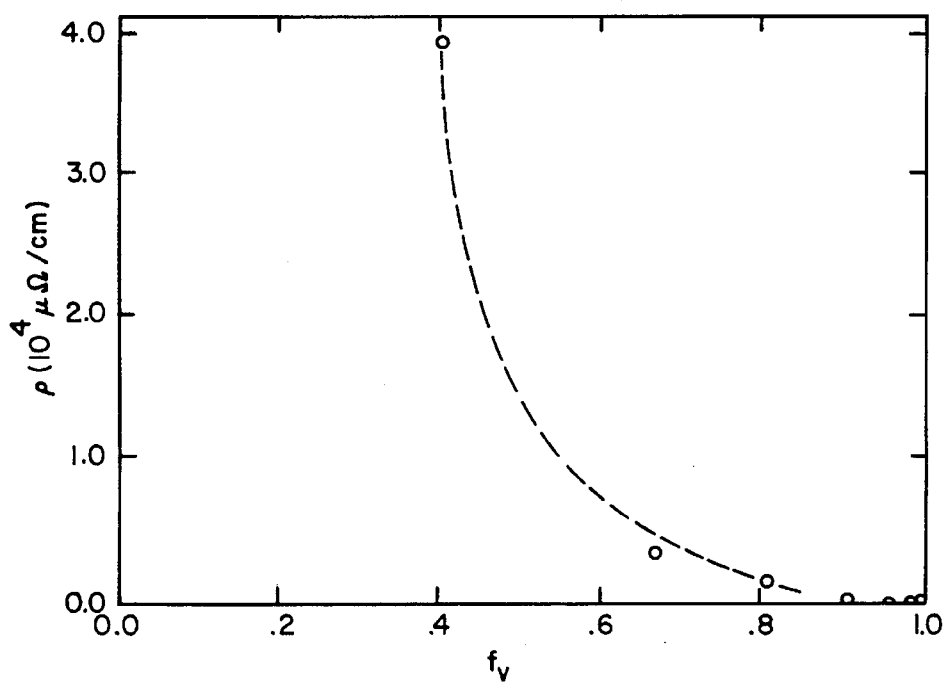
FIG. 1
FIG. 4

PHASE-SEPARATED MATERIAL (U)

BACKGROUND OF THE INVENTION

The present invention relates generally to magnetic coatings or films, and more particularly to magnetic coatings or films for use in both radar absorption and magnetic recording.

With respect to the area of magnetic recording, in order to increase the density of information stored on discs or tapes, new materials are required. Ideally the material should have a high saturation magnetization, large coercive force, and contain a large number of particles per unit volume n. The latter property is desirable since the signal-to-noise characteristics are improved if this is the case. Specifically, the signal voltage depends on the number of particles per unit volume, n, and the noise voltage depends on the square root of n. However, it is not possible to make the particles arbitrarily small, because they then act as super-paramagnets and the material has zero coercive force.

Current magnetic recording materials are primarily either alloys of Fe, Co, and Cr or their oxides. At present the oxides have been used more than metal films. In part this is because they are corrosion resistant. Metal films may be used more in the future because they have higher saturation magnetizations. The metal alloy films have saturation magnetizations of 500 to 1000 emu/cc and coercive forces of 350 to 600 Oe. Hard discs currently consist of 1,500 bits per inch along a track and 800 to 900 tracks per inch. The density of bits along the track is limited by the materials currently available.

There is considerable current interest in perpendicular recording as a means of increasing the bit density. However, the material's magnetization must be greater than 200 emu/cc and the necessary field gradients must be 1550 emu/micron. At present the bit density in perpendicular recording is limited by the grain size.

With respect to the area of radar absorption, magnetic thin film materials are required which do not reflect incident electromagnetic microwave radiation. In general, metals act as a mirror to incident radiation because they are good conductors. For a good conductor, the electric E field is zero at the surface. When an RF wave is incident on the conductor's surface, it must necessarily generate an electric field at the surface which is equal in magnitude but opposite in direction to the incident field so that the E fields cancel to maintain the E field zero at the surface. This new electric field is the electric part of the reflected wave. In order to avoid such wave reflection, it is necessary that the material have a large penetration depth so that the wave can proceed into the material where it can be attenuated or cancelled prior to exiting the material. This large penetration depth is accomplished by designing the material so that a large majority of the magnetic particles making up the material do not touch one another to form conducting paths through the material. When the magnetic particles comprising the material do not touch on average, the resistance of the material is increased.

Materials with large penetration depths can absorb radiation if they also have a large magnetic permeability, $\mu''$, for a desired bandwidth, where $\mu''$ is the imaginary part of the magnetic permeability which accomplishes the absorption of the microwave radiation. In this regard, the magnetic field generated by the material in response to microwave radiation which is in-phase with this radiation is proportional to the real part, $\mu'$ of the magnetic permeability. Usually the reflected wave is minimized if $\mu'=\epsilon$, where $\epsilon$ is the dielectric constant for the material. The imaginary part of the magnetic field is proportional to $\mu''$ and is 90° out of phase from the real part.

There is a need for high-temperature radar-absorbing materials because of the elevated temperatures of certain plane surfaces such as the leading edges of air foils and jet engine inlets and exhausts. To be useful as an engine exhaust RAM, for example, the material must function at 400°–600° C. and be able to survive the higher temperatures, 1100°–1200° C., that occur when the afterburner is on.

General Electric, in Contract Report No. AFAL-TR-82-1040, generated under contract F33615-80-C-1094 discloses a process for preparing Fe particles coated with $Al_2O_3$ for use as a radar absorbing material. In this process FeAl or FeCoAl alloys are prepared by means of inert gas atomization. These particles are then graded by size and particles of several microns in diameter are chosen for use to obtain best results.

The particles are heated so that the Al diffuses to the surface and then this surface coating of Al is oxidized. These particles are then put in a binder and the material is coated on a surface. Approximately 50 volume % of the composite is Fe. On the basis of the information available, this process has the following disadvantages:

1. The Fe particles are too large to be single domain. Thus, there is a broad multidomain resonance with much of the intensity above the "conventional" 2–18 GHz threat band.
2. The Al which does not diffuse out of the Fe lowers the Curie point approximately 50° C. This lowers the upper limit of usefulness of the material.
3. It is difficult to find a suitable binder which can withstand high temperatures, does not attack the aluminia coating the Fe, and also is capable of bonding to a given surface.
4. The process is complicated and expensive.

Objects of the Invention

Accordingly, it is an object of the present invention to produce small metallic clusters in an insulating matrix.

It is a further object of the present invention to produce small metallic clusters which are single magnetic domain clusters.

It is a further object of the present invention to produce a new radar absorbing material which has a large skin depth and an appreciable imaginary part of the magnetic permeability.

It is still a further object of the present invention to produce a radar absorbing material which can operate at high temperatures.

It is yet a further object of the present invention to produce a new magnetic coating material for magnetic recording applications.

It is still a further object of the present invention to produce a new magnetic recording material which is fine grained in nature to enhance the signal-to-noise characteristic thereof.

It is still a further object of the present invention to control the size of the metallic clusters in order to optimize for magnetic recording and RAM applications.

It is yet a further object of the present invention to increase the storage density of information in a magnetic storage medium.

Other objects, advantages, and novel features of the present invention will become apparent from the detailed description of the invention, which follows the summary.

Summary of the Invention

Briefly, the above and other objects are realized by a phase-separated material for disposition on a surface, comprising: Fe, Co, or an FeCo alloy in the form of small metallic clusters dispersed in an insulating matrix, such as, for example, BN. These metallic clusters are made small enough so that they are single-magnetic-domain clusters. Typically, the volume fraction of Fe, Co, or FeCo is in the range of 0.1 to 0.6.

The above defined material may be disposed on a magnetic storage substrate for recording magnetic signals thereon. Such magnetic storage substrates may comprise magnetic tapes or magnetic discs.

In the alternative, the above defined material may be utilized as a radar absorbing material for coating the outer skin of an aircraft or a surface ship.

BRIEF DESCRIPTION OF THE DRAWINGS

FIG. 1 is a schematic diagram of a method of preparation of the material of the present invention.

FIG. 4 is a graph showing the room temperature resistivity as a function of the volume fraction $f_v$ of an Fe film.

DETAILED DESCRIPTION OF THE PREFERRED EMBODIMENT

Figure 3:
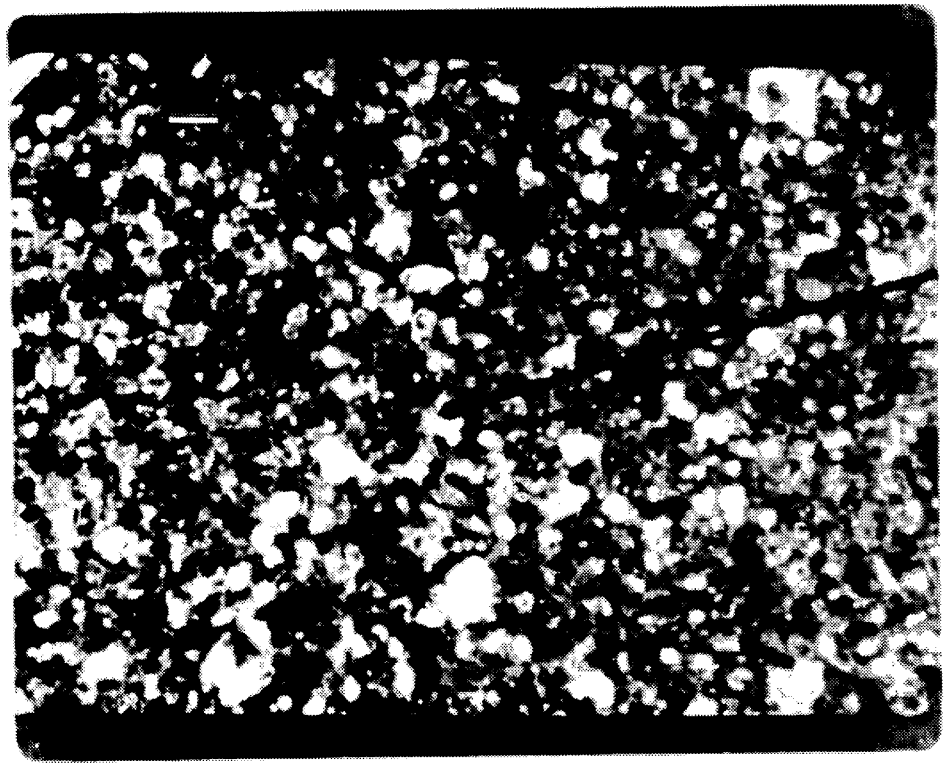
FIG. 3 is a dark field electron micrograph from the (110) reflection for Fe/BN films produced using a 500° C. substrate.

The present invention takes advantage of the phase-separation that occurs when two immiscible materials are cosputtered. Iron was chosen as the magnetic phase since the total absorption is determined by the material's saturation magnetization and Fe has the largest saturation magnetization of any readily available element. BN was chosen as the preferred insulator because it is very stable and the compounds that Fe forms with B or N are much less stable. BN is, in fact, so stable that it is used for making crucibles for melting high-temperature materials.

Although there are a variety of different methods for forming the present material of small metallic clusters of Fe in an insulating matrix of BN, RF cosputtering is the preferred method. RF cosputtering is advantageous because it provides considerable material flexibility, the phase-separated particles can be very small if there are enough nucleation sites, and the material can be prepared in a single step process. Samples of this material were prepared by RF cosputtering Fe and BN from a split target 10 as shown in FIG. 1. By way of example, this split target may be four inches in diameter, one eighth inch in thickness, and glued by means of a standard conducting epoxy on a one half inch copper substrate so that the Fe and BN are thermally connected to the copper. Half of the target 12 is 99.9% pure Fe, while the other half 14 of the target is HP boron nitride. The boron nitride may simply be pressed powder BN obtained from Carborundum Resistant Materials Co. This BN contains 3% Ca for improved moisture resistance.

Beneath the target 10 are disposed a set of substrates 16, 18, 20, 22 and 24 for sputtering the coating thereon. These substrates 16–24 are disposed on a table 26 which may be varied to provide a separation of between two to seven cm between the target 10 and the substrates. By way of example, these substrates 16–24 may be comprised of fused quartz substrates. Each of these substrate discs 16–24 may be 7 mm in diameter and the centers of adjacent discs may be separated by 12 mm, and the substrate discs may be 1 mm in thickness. The table 26 is capable of being set nominally at room temperature or it may be heated to a temperature such as 500° C.

The process of making the present material comprised the following steps. The pressure before sputtering was set to $5\times10^{-9}$ TORR. The target 10 was cleaned by presputtering for ten minutes at a power of 500 Watts to remove impurities from the target. The argon pressure used during the cleaning of the target and the sputtering step was 76 milli Torr. A voltage was applied between the target and the substrates 16–24 and an RF power of 1200 Watts was used. This sputtering step was performed for a period of time which may range from 20 and 180 minutes depending on the thickness of the coating desired. The actual sputtering step comprises the formation of a plasma of argon gas between the target 10 and the substrates 16–24. The positive ions from the argon plasma collide with the target 10 and ionized and neutral Fe atoms and ionized and neutral BN atoms are ejected therefrom to become part of the plasma. Fe and BN are then deposited on the substrates 16–24 from the plasma. The thickness of the film obtained using the above described sputttering was varied from 1000 A to 3.5 microns. A typical rf diode sputtering device which may be utilized to implement the above process is available from, among others, Perkin-Elmer.

Phase-separation occurs between the Fe and the BN in the coating or film because these two materials are immiscible, i.e., the materials do not form a mixture, but separate into the two separate phases, i.e., Fe and BN. This phase separation has been verified by electron diffraction measurements which established the presence of small αFe particles in an insulating matrix of BN. αFe is a crystalline structure for iron which is advantageous because of its large saturation magnetic moment. The saturation magnetic moment is the magnetic moment which is high enough to align all of the magnetic domains of the material. Note that the total radiation absorption is proportional to the saturation magnetic moment. A significant feature of this material is that the αFe particles or clusters formed have such a small dimension that each particle comprises a single magnetic domain with all of the spins in the given particle being in parallel. It appears that this single domain phenomena can occur for this material for particles or metallic clusters with a dimension of less than 1000 A.

Figure 2:
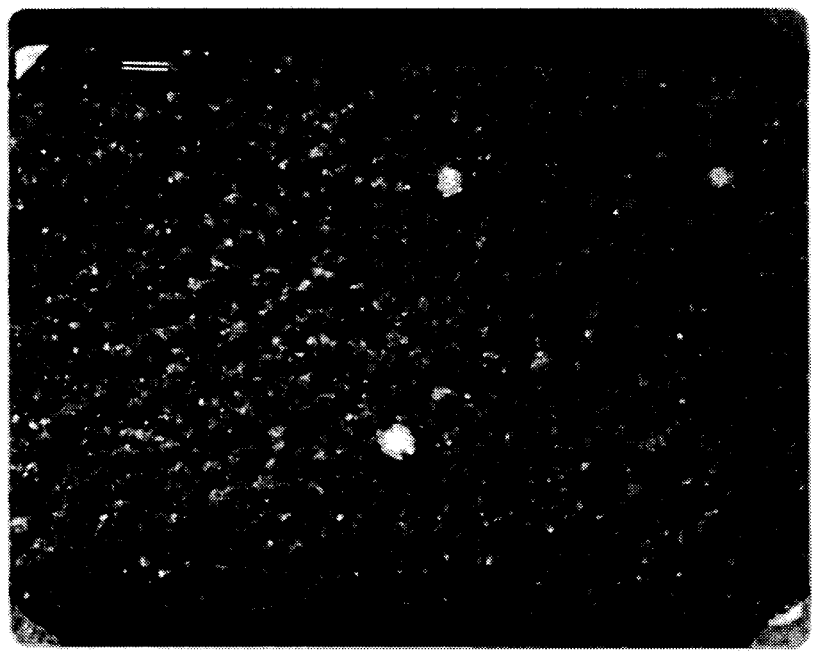
FIG. 2 is a dark field electron micrograph from the (110) reflection for Fe/BN films produced using a room temperature substrate.

It was discovered that the size of the individual metallic clusters or particles could be varied by changing the temperature of the table 26 upon which the substrates 16–24 are disposed. FIGS. 2 and 3 are dark-field electron micrographs using the electrons from the strongest of the —Fe ring, the (110) reflection, for films that were approximately 1000 Å in thickness prepared on carbon substrates mounted on tungsten grids. The bright regions in FIGS. 2 and 3 are regions of αFe. The dark regions are regions of BN or Fe regions with their crystalline axis aligned differently. For FIG. 2, the film was cosputtered onto the carbon substrates with the carbon substrates heated to room temperature by means of the table 26. In FIG. 3, the substrates 16–24 were heated to 500° C. by means of the table 26. It can be seen that increasing the substrate temperature has a large effect in increasing the αFe particle size. For the room temperature substrate sample shown in FIG. 2, the particle size varied between 10 and 30 Å. Note that the small scale-line in the upper right portion of the figure represents 1000 Angstroms. For the 500° C. substrate sample shown in FIG. 3, the particle size varied between 200 and 1000 Å. Note that the small scale-line in the upper right portion of the figure represents 500 Angstroms.

In addition to the use of the substrate temperature for controlling the particle size, the average composition of the coating also has an effect on the particle size. In this regard, dilute samples of approximately five volume percentage Fe also have very small Fe particles of on the order of 20 Å. The composition of the film may be varied and controlled via a number of different methods. One such method of composition variation is set forth below.

The compositions of the sputtered films on the substrates 16–24 can be varied monotonically, depending upon the substrate position relative to the sputtered split target 10. The sample with the highest Fe concentration was produced on the substrate 16 which was farthest from the BN half 14 of the target 10. Likewise, the lowest Fe concentration was in the coating on the substrate 24. The largest concentration differences between adjacent samples were produced when the distance between the target 10 and the substrate samples 16–24 was the smallest.

It should be noted that there are a number of alternative methods of preparation of the above described film. For example, two sputtering sources with independent power supplies could be utilized so that Fe and BN could be sputtered independently. By changing the ratio of the power settings of these two power supplies, the composition of the film at a particular position on the substrates 16–24 can be varied. This variation permits the preparation of films whose composition varies as a function of the distance into the film. This variation of the film composition versus depth into the film may be accomplished simply by varying the RF power for BN over time to increase or decrease its percentage volume relative to Fe. This composition versus depth capability is especially advantageous in designing the material to withstand thermal stress and to help it to adhere to a surface.

The resistivity of the films, determined by a 4 point probe, is shown in FIG. 4 as a function of the composition $f_v$ of iron. These measurements were taken on a series of samples prepared using a room temperature substate. As expected, the resistivity increases with decreasing $f_v$. However, when the volume fraction of Fe is reduced to 0.4, the resistance increases by approximately three orders of magnitude. In essence, there is an abrupt metal to non-metal transition when the Fe particles become so dilute that they no longer form conducting paths through the material. The condition where there is just such a conducting path is equivalent to the existence of a macroscopic cluster in which most of the Fe atoms have at least one Fe nearest neighbor. The concentration of Fe at which this occurs is called the percolation threshold. For a random occupancy of the Fe atoms, this threshold is predicted to occur at an $f_v$ of 0.16. However, it can be seen from FIG. 4 that the percolation threshold occurs at approximately $f_v=0.4$. This higher threshold value of $f_v$ occurs due to the presence of chemical clustering in the material.

If the coating or film has an Fe concentration above its percolation threshold, then it will essentially become a conductor and reflect radar microwaves. However, it is essential that a sufficient amount of Fe be present in the film in order to attenuate the microwaves once they have penetrated into the film. Accordingly, the high percolation threshold characteristic is an essential feature because it permits the formation of a coating with a long penetration depth, and yet permits a relatively high Fe filling factor in the coating. By way of example, for a typical value of 1 ohm-cm for the resistivity, and $\epsilon=10$ and a $\mu'=4$, the penetration depth at 10 GHz is 0.06 cm. Accordingly, it can be seen that such coatings have a relatively long penetration depth. The magnetic material may have a volume fraction range of 0.1 to 0.6, depending on the material characteristics, with a preferred range of 0.2 to 0.5. For the samples discussed earlier, a value of $f_v$ equal to 0.35 would be suitable.

Figure 5:
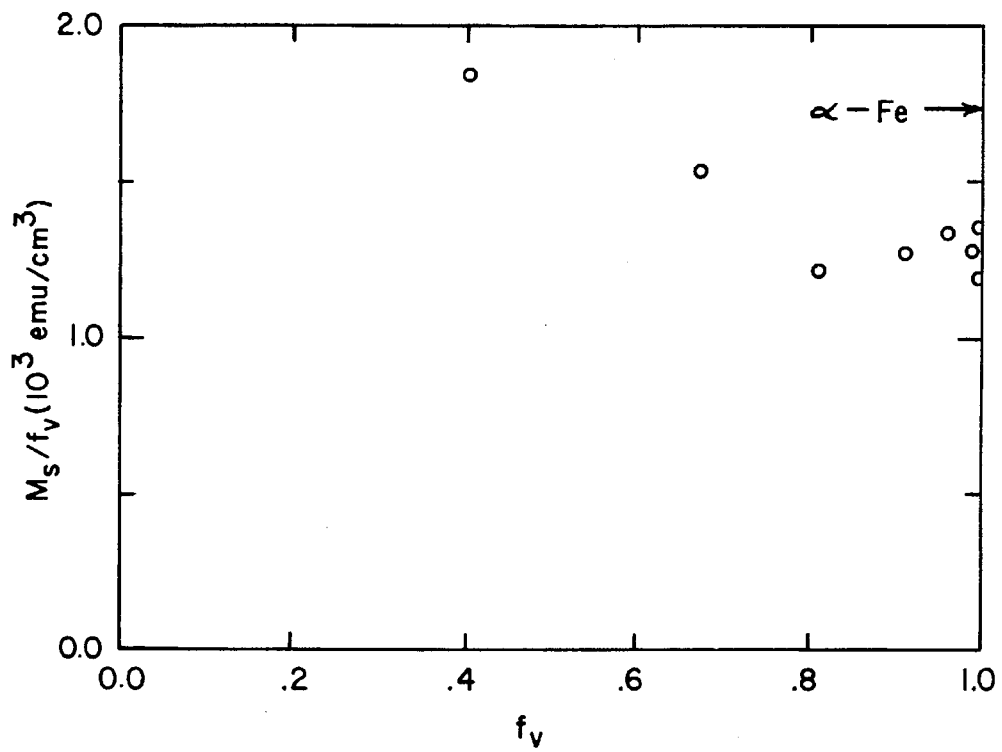
FIG. 5 is a graph showing the saturation magnetization divided by the volume fraction $f_v$ of an Fe film versus $f_v$.
Figure 6:
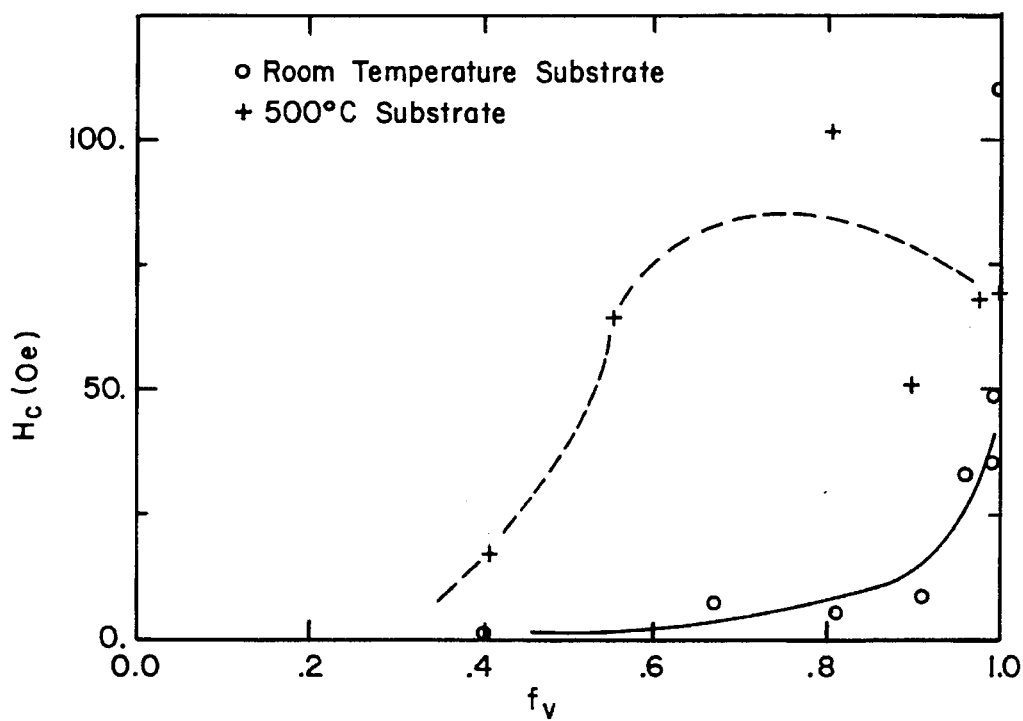
FIG. 6 is a graph of the room temperature coercive force of an Fe film versus $f_v$ for samples prepared on room temperature and 500° C. substrates.

In order to characterize the magnetic properties, magnetization measurements were made at room temperature using a vibrating sample magnetometer. Magnetic fields of up to 6 kOe were applied in the plane of the film. In FIG. 5 the saturation magnetization per unit volume divided by $f_v$ is plotted as a function of $f_v$ for a series of samples prepared on room temperature substrates. Also shown is the value for αFe. It can be seen that the saturation magnetization per unit volume of Fe is approximately the same as the volume fraction of Fe in the sample and its magnitude is within 20% that of bulk αFe. Measured values for the coercive force for this series of samples and a similar series prepared used 500° C. substrates are plotted in FIG. 6 as a function of $f_v$. It can be seen that for $f_v=1$, the coercive force is 75–100 Oe. For smaller values of $f_v$, the coercive force decreases at a rate which is much larger for the samples prepared on room temperature substrates. The fact that the coercive force decreases with decreasing $f_v$ is probably associated with the fact that small, isolated ferromagnetic particles act as superparamagnets if $kT > H_A N \mu_a$ where T is the temperature, N is the number of ferromagnetic atoms in the particle, $\mu_a$ is the magnetic moment per ferromagnetic atom, and $H_A$ is the magnetic anisotropy field. Such small particles are superparamagnetics because the thermal fluctuations are large enough to allow the total moment of the particles $N\mu_a$ to overcome the anisotropy barrier and realign the magnetization.

The normal incidence absorption of a flat, thick coating of the present material on a metallic substrate was calculated in order to estimate the radar-absorbing capability of the present material.

Figure 7:
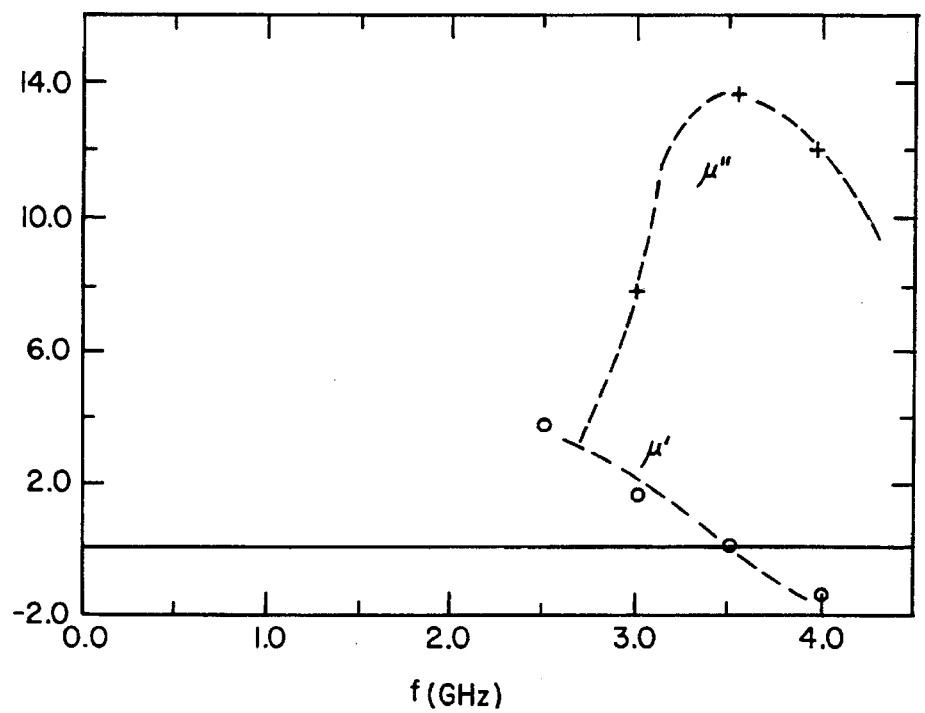
FIG. 7 is a graph of the real $\mu'$ and imaginary $\mu''$ part of the magnetic permeability of a 3.5 μ thick film measured by zero field ferromagnetic resonance measurements vs. frequency in GHz.
Figure 8:
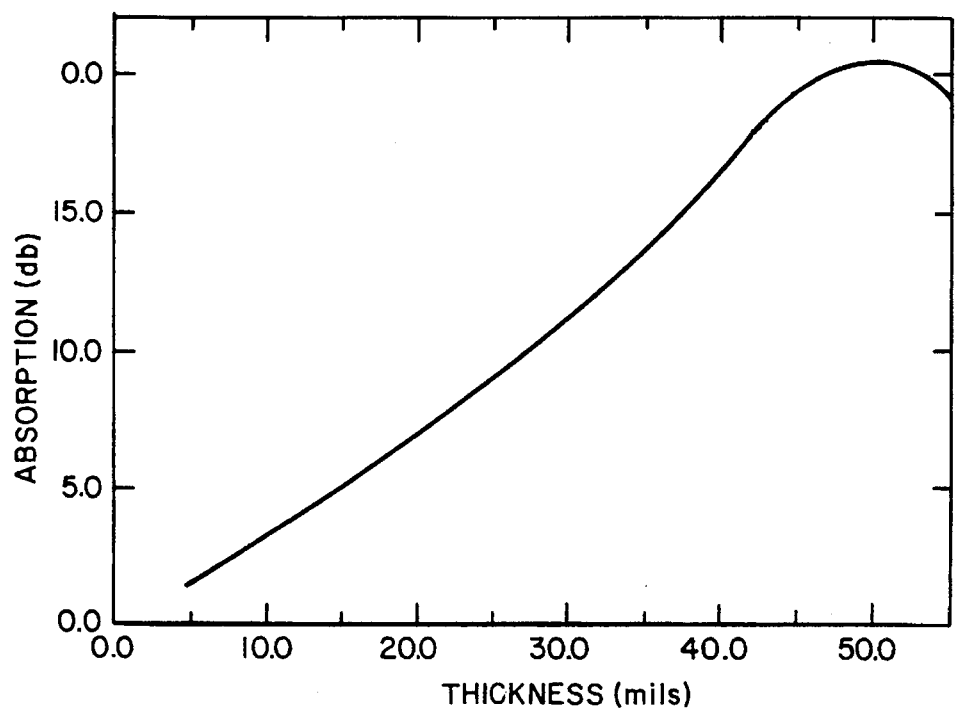
FIG. 8 is a graph of the theoretical absorption of a film with a metallic backing vs. the thickness (mils) of the film.

The values for the parameters used in the calculation were mainly determined from experiment. FIG. 7 shows a plot of the real part $\mu'$ and imaginary part $\mu''$ of the magnetic permeability at room temperature of a 3.5 μ thick film as a function of frequency. Based upon these results, it was assumed in the calculation that center resonance frequency is 3 GHz, the resonance width is 1 GHz, $\mu''$ is equal to 12 at resonance, $\epsilon=10$ and the loss tangent=1. Using the above values, the absorption of microwaves by the coating was calculated and plotted versus thickness in FIG. 8. It can be seen that the thickness required for 5 dB absorption is only 0.015 inches. This absorption may be sufficient if the absorber is used on a surface where the wave can be expected to be reflected several times. The absorption, to a good approximation, scales with $\mu''$ for a given thickness and is almost independent of $\epsilon$. The absorption reaches a maximum of 20 dB at a thickness of 0.050 inches, which corresponds to the thickness of a quarter wavelength absorber.

The above measured value of $\mu''$ is also consistent with the value obtained from $\mu''=\alpha 4\pi M_s/\Delta W$, with a value for $\Delta W$ of approximately 0.5 GHz and a reasonable value for $M_s$ based upon the saturation magnetization $M_s$ of Fe and the estimated value of $f_v$.

It can be seen that the coercive force $M_s/f_v$ as a function of $f_v$ is shown in FIG. 5 for both small size and 300 A Fe particles. It can be seen that the coercive force for the 300 A particles does not decrease to zero after the particles are isolated from one another. (The particles essentially become isolated from one another at $f_v=0.4$.) This characteristic is to be contrasted to the case of the smaller particles where the coercive force does fall to zero for $f_v=0.4$. This difference is due to the fact that very small particles act as super-paramagnets. It should be noted the more dilute of the samples prepared on the 500° C. substrates also have low coercive fields. This occurs because, as noted above, the Fe particles at these compositions are small. The fact that small particles act as super-paramagnets limits the smallest size particle (or highest temperature) that can be used if isolation of the particles is required.

The new material disclosed herein is especially suitable as a radar-absorbing material and as a magnetic recording material because of its small, isolated single domain magnetic particles disposed in an insulating matrix. One of the advantages of this material, when used as a radar-absorbing material, is that the matrix BN makes it ideally suited for high-temperature applications. It should be noted that the use of the Fe as the magnetic metal generally limits the operating temperature to below the Curie temperature of Fe, 770° C. However, this limitation can be removed by using Co or an FeCo alloy. The Curie temperature of Co is 1130° C. Accordingly, the use of such magnetic metals permits a higher operating temperature of on the order of 900° C. This higher operating temperature offers significant advantages, as noted previously. The Co or FeCo alloys would be sputtered with BN onto the substrates in the same manner as previously discussed. For the FeCo alloy, the Co concentration may be in the range of 10–70% in the alloy.

It should also be noted that for magnetic recording applications, FeCo alloys act to increase the coercive force, i.e., the magnetic field necessary to reduce the magnetization built into the material to zero. This coercive force must be large enough to retain memory, but small enough that it can be written over when desired.

Although BN is the preferred insulating material, $SiO_2$ and $Al_2O_3$ may also be used to form the insulating matrix, provided that a method such as cosputtering is used to ensure that the metallic clusters are single domain clusters.

The new material set forth above is a phase-separated material for disposition on a surface, and comprises either an Fe, Co, or an FeCo alloy in the form of small, isolated, single domain metallic clusters or particles disposed in an insulating matrix. The particle or cluster size can be controlled by controlling the substrate temperature and composition. For RAM applications, the microwave penetration depth can be made long provided that the volume fraction of the magnetic material is kept below the percolation threshold.

It should be noted that the present material utilizes a matrix of BN which acts both as the binder, and also as an insulator. The metallic particles or clusters produced in this material are small enough that they are single domain, and have a narrow resonance 1 GHz wide at 3.5 GHz. The narrowness of this resonance is responsible for the large value of $\mu''=12$. However, the center frequency and the width can be controlled and manipulated over a rather wide range by varying the volume fraction of Fe. For a 0.5 volume fraction of Fe, the resonance occurred at 3.5 GHz. The center frequency can also be varied by changing the anisotropy of the metallic phase by alloying. It should be noted that the above defined frequency range for resonance, and thus, microwave absorption, is in the low frequency part of the "conventional" 2–18 GHz threat band where it is difficult to find a suitable absorber.

The present material has a magnetic permeability which is comparable to or greater than current magnetic materials. This new material can operate at high temperatures since the BN is a very stable material. The stability of the BN insulating matrix is such that it protects the magnetic particles Fe from oxidation at room temperature, even when stored in air.

The present material can be produced by means of simple methods and is capable of being produced using rapid-rate sputtering techniques to produce large volumes of the material.

The phase-separation in combination with the high percolation concentration threshold are essential features of the material. In particular, the high percolation concentration threshold permits magnetic material concentrations of $\alpha$Fe of on the order of 0.4 or higher while still maintaining the magnetic particles in an isolated state so that these particles are not touching each other and providing a conductive path. This high concentration of the magnetic material provides the material with a significant absorption characteristic for microwaves.

It should be noted that the present material can be formulated with a composition gradient as a function of the distance into the film. This composition gradient facilitates matching the thermal expansion of the substrate.

As noted above, the present material is also especially suitable for use as a magnetic recording material because it is composed of small, isolated, single domain particles. As noted above, the particle size can be controlled by the substrate temperature and composition so that it can be made as small as possible without acting as a super-paramagnetic. The saturation magnetization for this material is large, approximately 40% that of Fe. This value for the saturation magnetization, 686 emu cc, is large enough to be suitable for perpendicular recording. Also, because there is flexibility in the choice of the magnetic material, FeCo alloys can be used to increase the coercive force.

The small, single domain particles of the present material permit the storage of data at much higher densities ($10^5$ bits/inch) along a track. Also, the small particle size permits the field gradient requirement for perpendicular recording and bit density to be met.

It should also be noted that by keeping the volume fraction of the magnetic metal below the percolation limit, the BN will act to protect the magnetic particles from oxidation. This feature eliminates the need for housing the coating or film in an inert atmosphere or using an additional protective coating. One or the other of these methods must be used for current metallic recording media. The protective coating in these prior art recording media prevents the magnetic head from moving close to the actual magnetic recording media. Thus, the protective coating limits the density of information that can be stored on the magnetic recording film.

It should also be noted that the present film is found to be tough and abrasion resistant thereby simplifying maintenance and minimizing the possibility of disc failure.

Accordingly, a new material has been discovered which is especially suitable as a radar-absorbing material, and also for use as a magnetic recording medium. Since the particle size and the number of particles per unit volume and their composition can be controlled, the saturation magnetization and the coercive force of the material can be optimized for magnetic recording applications. Likewise, the penetration depth and the volume fraction of the magnetic material can be optimized for radar-absorbing applications.

Finally, it should be noted that the present material may be utilized as a dielectric absorber because the small particles in the material have anomolously large dielectric absorption. Thus, this material can be utilized up through the range of 1000°–1500° C.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A phase-separated material for deposition on a surface comprising: from about 10 to 60 percent of total material volume of single-magnetic-domain clusters or particles of a magnetic metal selected from the group consisting of $\alpha$—Fe, Co, and $\alpha$—FeCo alloys dispersed in an insulating matrix of BN.

2. A material as defined in claim 4 wherein said magnetic metal is from 20 to 50 percent of total material volume.

3. A material as defined in claim 2 wherein said magnetic metal is 40 percent of total material volume.

4. A material as defined in claim 1, wherein said magnetic metal is an alloy of $\alpha$—FeCo comprising from about 10 to about 10 percent of the total alloy weight of cobalt.

5. A material as defined in claim 4 wherein said magnetic metal is from 20 to 50 percent of total material volume.

6. A material as defined in claim 1, disposed on the surface of a magnetic storage substrate for recording magnetic signals therein.

7. A material as defined in claim 6, wherein said magnetic storage substrate is a tape.

8. A material as defined in claim 6, wherein said magnetic storage substrate is a disc.

9. A material as defined in claim 1, wherein said magnetic metal is $\alpha$—Fe.

10. A material as defined in claim 1, wherein said surface is the outer surface of an aircraft.

11. A material as defined in claim 1, wherein said surface is the outer surface of a surface ship.

* * * * *